US011700431B2

(12) United States Patent
Mao et al.

(10) Patent No.: US 11,700,431 B2
(45) Date of Patent: Jul. 11, 2023

(54) POLICY BASED TRANSCODING

(71) Applicant: Comcast Cable Communications, LLC, Philadelphia, PA (US)

(72) Inventors: Weidong Mao, West Windsor, NJ (US); Jason Press, Bryn Mawr, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 608 days.

(21) Appl. No.: 15/979,740

(22) Filed: May 15, 2018

(65) Prior Publication Data

US 2019/0124409 A1 Apr. 25, 2019

Related U.S. Application Data

(63) Continuation of application No. 15/067,902, filed on Mar. 11, 2016, now Pat. No. 10,015,560.

(51) Int. Cl.
*H04N 21/231* (2011.01)
*H04N 21/2343* (2011.01)
(Continued)

(52) U.S. Cl.
CPC ..... *H04N 21/64769* (2013.01); *H04L 67/568* (2022.05); *H04N 19/40* (2014.11);
(Continued)

(58) Field of Classification Search
CPC ....... H04N 21/2343; H04N 21/234309; H04N 21/234318; H04N 21/234327; H04N 21/234336; H04N 21/234345; H04N 21/234354; H04N 21/234363; H04N 21/234372; H04N 21/234381

See application file for complete search history.

(56) References Cited

U.S. PATENT DOCUMENTS 7,843,824 B2 * 11/2010 Wu ........................ H04J 3/1688
370/230.1
2002/0087797 A1 7/2002 Adrangi
(Continued)

OTHER PUBLICATIONS

Duo et al.: "Optimized streaming media proxy and its applications," Journal of Network and Computer Applications, New York, Nov. 3, 2006.
(Continued)

*Primary Examiner* — Hsiungfei Peng
(74) *Attorney, Agent, or Firm* — Banner & Witcoff, Ltd.

(57) ABSTRACT

Methods and systems are disclosed for providing video content in response to requests in a content delivery system with more speed and efficiency. In some aspects, network monitoring devices may gather content specific and network performance metrics, from user devices and content delivery components, to provide input to a computing device for deciding whether to store or delete different versions of the same or different items of content. The decision may be based on a policy which may include a weighted score based on a combination of usage and network efficiency scores. In other aspects, methods and systems are provided to initially provide to a user device a stored version of a content item, and then switch, as needed, to a different version of the content item using on-demand transcoding.

26 Claims, 6 Drawing Sheets

(51) Int. Cl.
  *H04N 21/24* (2011.01)
  *H04N 21/647* (2011.01)
  *H04N 21/845* (2011.01)
  *H04N 19/40* (2014.01)
  *H04L 67/568* (2022.01)

(52) U.S. Cl.
  CPC . *H04N 21/23106* (2013.01); *H04N 21/23113* (2013.01); *H04N 21/23439* (2013.01); *H04N 21/234336* (2013.01); *H04N 21/2407* (2013.01); *H04N 21/8456* (2013.01)

(56) References Cited

U.S. PATENT DOCUMENTS

| | | | |
|---|---|---|---|
| 2003/0147631 A1* | 8/2003 | Zimmermann | H04N 9/7921 386/200 |
| 2009/0083279 A1 | 3/2009 | Hasek | |
| 2010/0070997 A1 | 3/2010 | Friedman | |
| 2010/0131989 A1 | 5/2010 | Casimere | |
| 2010/0235542 A1* | 9/2010 | Visharam | H04N 21/234354 709/246 |
| 2011/0225140 A1 | 9/2011 | Wu | |
| 2012/0195362 A1 | 8/2012 | Benno et al. | |
| 2013/0290697 A1* | 10/2013 | Wang | H04L 63/0428 713/150 |
| 2013/0325952 A1 | 12/2013 | Draznin et al. | |
| 2014/0188974 A1 | 7/2014 | Ioannidis et al. | |
| 2015/0264413 A1 | 9/2015 | Buehl et al. | |
| 2016/0006836 A1* | 1/2016 | LeFaucheur | H04L 67/42 709/203 |
| 2016/0226735 A1 | 8/2016 | Tulino et al. | |

OTHER PUBLICATIONS

May 4, 2017—(EP) Extended Search Report—App 17160301.2.
2011—"Difference Between Bandwidth and Data Rate"—DifferenceBetween.com.
Jan. 7, 2019—EP Examination Report—EP 17160301.2.

* cited by examiner

POLICY BASED TRANSCODING

CROSS-REFERENCE TO RELATED APPLICATIONS

This application is a continuation of co-pending U.S. application Ser. No. 15/067,902, which was filed on Mar. 11, 2016, and is hereby incorporated by reference in its entirety.

BACKGROUND

Video services, such as video on demand (VOD), cloud-based digital video recorder (DVR) services, streaming and linear services, typically provide video content to users upon request by the users. Since users may have differing equipment for processing and presentation, and may have varying network bandwidth capabilities, each video may need to be delivered in one of a number of different formats in order to serve any particular user. For example, users may have presentation devices of differing display sizes or they may support various sets of codecs. In addition, various network bandwidth conditions may exist in the path to a user and these conditions may change over time. In order to serve these users, some existing systems prepare and store copies of each video in a number of different formats. A problem with this existing approach is that the number of stored versions becomes very large and the required storage may become expensive to provide.

Some other systems store content in a single format and perform on-demand transcoding, such as just-in-time transcoding, in order to provide the content in a format appropriate for a particular user device. These systems require much less storage; however, on-demand transcoding of video content can be a processor intensive activity. Therefore, these systems must provision sufficient processing capability to handle an expected user demand for videos. Providing sufficient processing capability may require the purchase and installation of computer hardware, which may be expensive.

The number of various format requirements has increased significantly in recent years. This disclosure addresses the need for improved content delivery methods and systems for delivering a wide variety of content, in a variety of formats, to users.

SUMMARY

The following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In some aspects of the disclosure, information related to requests for content items and information related to network usage may be used in determining whether to pre-transcode the content items, prior to request, or to transcode the content items upon receiving a request for the content items (e.g., just-in-time transcoding). In some aspects, pre-transcoding and just-in-time transcoding may both be used for a particular content item. For example, one portion of the content item may be pre-transcoded and stored for delivery while another portion may not be transcoded until a request is received for that portion.

In some aspects of the disclosure, a popularity of various content items may be determined. The determination may be based on requests for the content items received from user devices. In other aspects, network bandwidth and cache usage corresponding to the content items may be determined. This popularity information and network/cache information may be used in determining which content items to pre-transcode to a particular compression format and resolution, for example to make available for requests, and which content items to transcode upon request. In some embodiments, the information may be used in determining a particular portion of a content item to pre-transcode, while a remaining portion may be transcoded upon request for the remaining portion.

In other aspects, a cache hit ratio (e.g., the number of requests for content available from a cache divided by the total number of content requests) for one or more content items delivered by a content delivery network may be determined. An efficiency score may be calculated based on the cache hit ratio and the bitrate corresponding to each of the content items. Different encodings of a content item may result in different efficiency scores, based on the bitrate and the cache hit ratio corresponding to each of the encodings. In some aspects, the efficiency score may be used in determining which content items to pre-transcode to a particular compression format and resolution, and which content items to transcode upon request. In some embodiments, the efficiency score may be used in determining a particular portion of a content item to pre-transcode, while a remaining portion may be transcoded upon request of the remaining portion.

In some embodiments, a policy may be applied to select compression formats and resolution profiles for storing particular content items. The policy may implement a formula, based on usage scores and efficiency scores for various content items. The results of the formula may be used in determining which content items, and/or which portions of the content items, to store and which items or portions should not be stored.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

Figure 1:
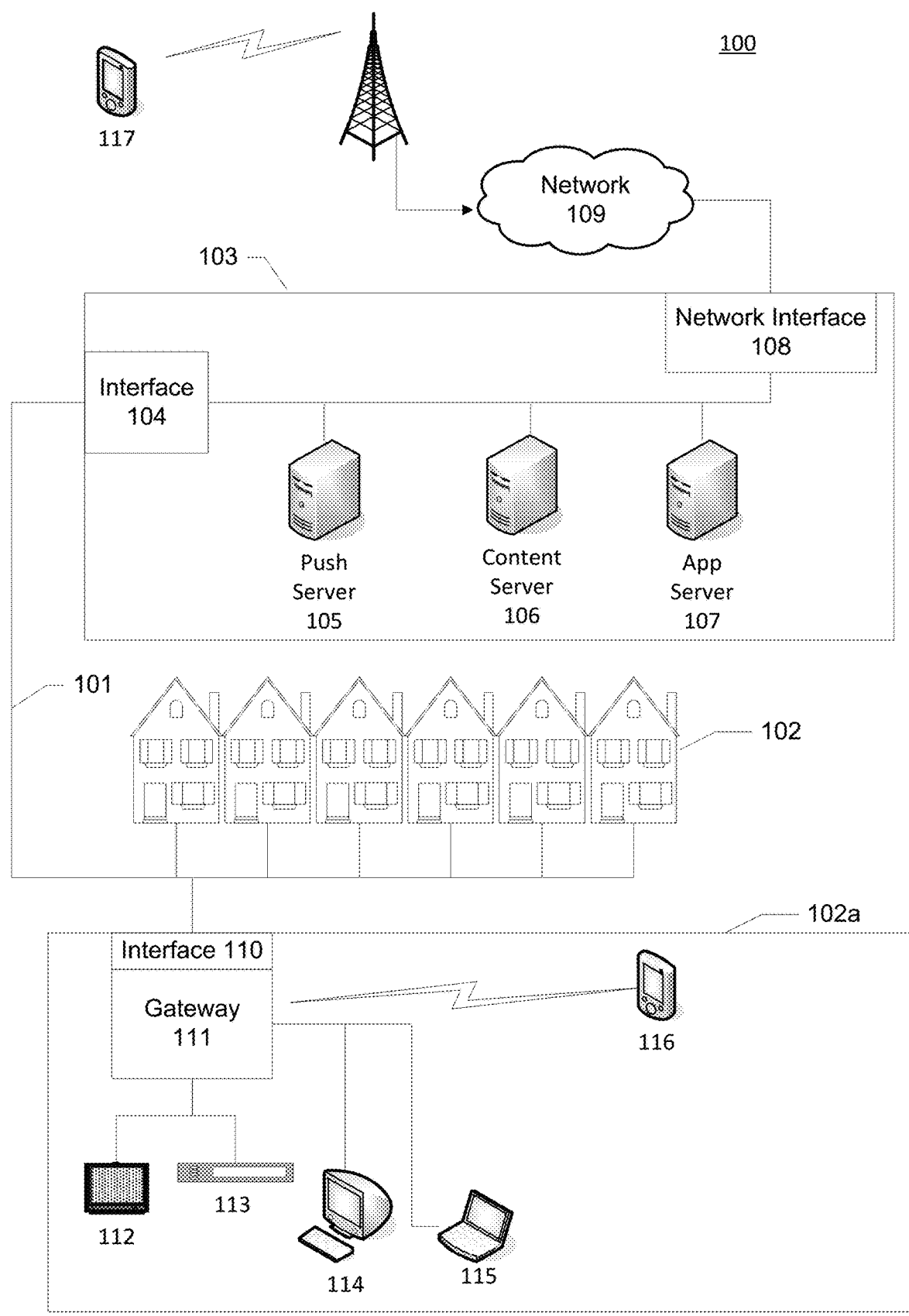
FIG. 1 illustrates an example information access and distribution network in accordance with one or more aspects as described herein.

FIG. 1 illustrates an example information distribution network 100 on which many of the various features described herein may be implemented. The network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office 103 (e.g., a headend, a processing facility, etc.). The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface 104, such as a termination system (TS), for example a cable modem termination system (CMTS) in an example of an HFC-type network, which may be a computing device configured to manage communications between devices on the network of links 101 and backend devices such as servers 105-107 (to be discussed further below). In the example of an HFC-type network, the TS may be as specified in a standard, such as the Data Over Cable Service Interface Specification (DOCSIS) standard, published by Cable Television Laboratories, Inc. (a.k.a. CableLabs), or it may be a similar or modified device instead. The TS may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, telephone networks, cellular telephone networks, fiber optic networks, local wireless networks (e.g., WiMAX), satellite networks, and any other desired network, and the interface 108 may include the corresponding circuitry needed to communicate on the network 109, and to other devices on the network such as a cellular telephone network and its corresponding wireless devices 117 (e.g., smart phones).

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users in the homes. This content may be, for example, video on demand movies, television programs, songs, audio, services, information, text listings, etc. In some embodiments, the content server 106 may include software to validate (or initiate the validation of) user identities and entitlements, locate and retrieve (or initiate the locating and retrieval of) requested content, encrypt the content, and initiate delivery (e.g., streaming, transmitting via a series of content fragments) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Red Hat Linux, HTML5, JavaScript, AJAX and COMET). For example, an application server may be responsible for collecting television program listings information and generating a data download for electronic program guide listings. Another application server may be responsible for monitoring user media habits and collecting that information for use in selecting advertisements. Another application server may be responsible for formatting and inserting advertisements in a video stream and/or content item being transmitted to the premises 102. It should be understood by those skilled in the art that the same application server may be responsible for one or more of the above listed responsibilities.

An example premises 102a may include an interface 110 (such as a modem, or another receiver and/or transmitter device suitable for a particular network), which may include transmitters and receivers used to communicate on the links 101 and with the local office 103. The interface 110 may be, for example, a coaxial cable modem (for coaxial cable lines 101), a fiber interface node (for fiber optic lines 101), or any other desired modem device. The interface 110 may be connected to, or be a part of, a gateway interface device 111. The gateway interface device 111 may be a computing device that communicates with the interface 110 to allow one or more other devices in the home to communicate with the local office 103 and other devices beyond the local office. The gateway interface device 111 may be a set-top box (STB), digital video recorder (DVR), computer server, or any other desired computing device. The gateway interface device 111 may also include (not shown) local network interfaces to provide communication signals to other devices in the home (e.g., user devices), such as televisions 112, additional STBs 113, personal computers 114, laptop computers 115, wireless devices 116 (wireless laptops, tablets and netbooks, mobile phones, mobile televisions, personal digital assistants (PDA), etc.), and/or any other desired computers, and/or other devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others.

Gateway 111 may communicate with various elements in a wide area network being external to premises 102. Those elements can include, e.g., wireless devices 117, call management servers, and other conventional network elements used to create and maintain various types of communication sessions. External network 109, which may be of regional or national scope, may include a number of sub-networks and/or links to additional networks. For example, network 109 may include an access sub-network that connects gateway 111 (and other gateways at other premises, not shown) to network 109. That access sub-network could be any of various types. Examples of access sub-network types in various embodiments include, but are not limited to, a passive optical network (PON) access sub-network, a digital subscriber line (DSL) access sub-network, a wide area wireless access sub-network and a hybrid fiber coaxial (HFC) access sub-network.

For example, in an HFC access sub-network, a network interface 110 may include hardware for tuning to RF frequency channels, for demodulating signals received in those tuned channels, for outputting data from demodulated signals for further processing, for modulating data onto an upstream signal, and for transmitting that upstream signal to network 109. In a PON access sub-network, a network interface 110 may include the components of an optical network terminal (ONT) that performs modulation, demodulation, transmission, and receiving operations. In a wide area wireless access sub-network, a network interface 110 may include a wireless transceiver that performs tuning, modulation, demodulation, transmission, and receiving operations. In a DSL access sub-network, a network interface 110 may include a DSL modem that performs the modulation, demodulation, transmission, and receiving operations. In still further embodiments, a network interface may include an Ethernet or other local network interface that connects gateway 111 to a separate cable modem, ONT, wireless transceiver, DSL modem or other access sub-network connection point.

Moreover, an access sub-network connecting gateway 111 to network 109 may utilize known media access control (MAC), transport and other communication protocols conventionally used with a particular type of access sub-network architecture and communication technology. Network 109 may include numerous access sub-networks of different types, including those listed above.

Gateway 111 may communicate with different elements in network 109 so as to obtain different types of services. For example, one or more operators of network 109 may provide a general-purpose data service to premises 102 that allows gateway 111 to access the public Internet and/or other public data networks. As another example, the operator of network 109 may provide various types of multicast and/or unicast content (e.g., movies, television programming, etc.) to premises 102 through gateway 111. As a further example, an operator of network 109 may provide telephony or other type of voice communication services to premises 102 through gateway 111.

Figure 2:
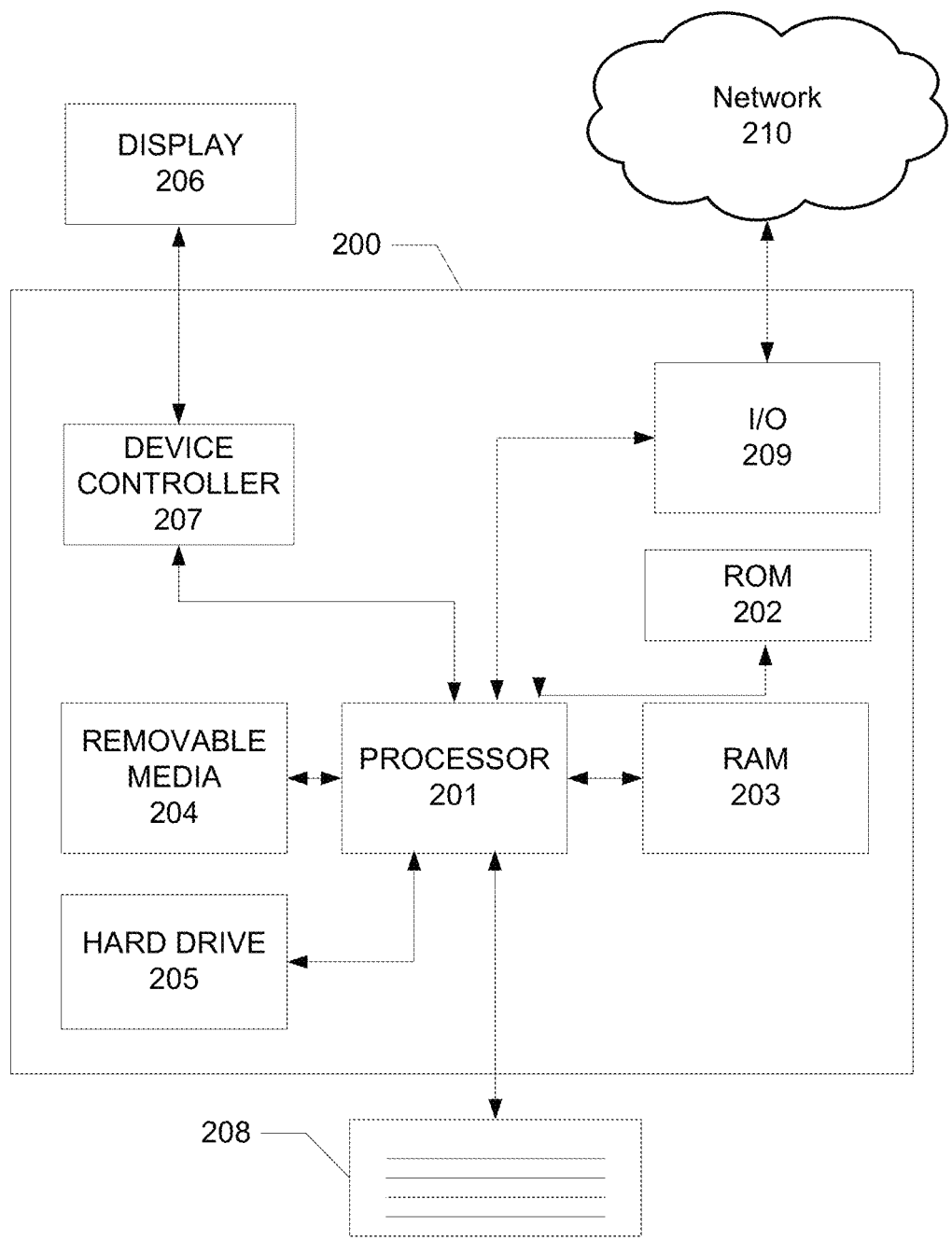
FIG. 2 illustrates an example computing device that may be used to implement any of the features and devices described herein.

FIG. 2 illustrates general hardware elements of an example computing device 200 that can be used to implement any of the elements discussed herein and/or illustrated in the figures. The computing device 200 may be stationary or mobile, may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network.

The FIG. 2 example is an example hardware configuration. Modifications may be made to add, remove, combine, divide, etc. components as desired. Additionally, the components illustrated may be implemented using basic computing devices and components, and the same components (e.g., processor 201, storage 205, display 206, etc.) may be used to implement any of the other computing devices and components described herein. For example, the various components herein may be implemented using computing devices having components such as a processor executing computer-executable instructions stored on a computer-readable medium, as illustrated in FIG. 2.

One or more aspects of the disclosure may be embodied in computer-usable data and/or computer-executable instructions, such as in one or more program modules, executed by one or more computers (such as computing device 200) or other devices to perform any of the functions described herein. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired in various embodiments. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
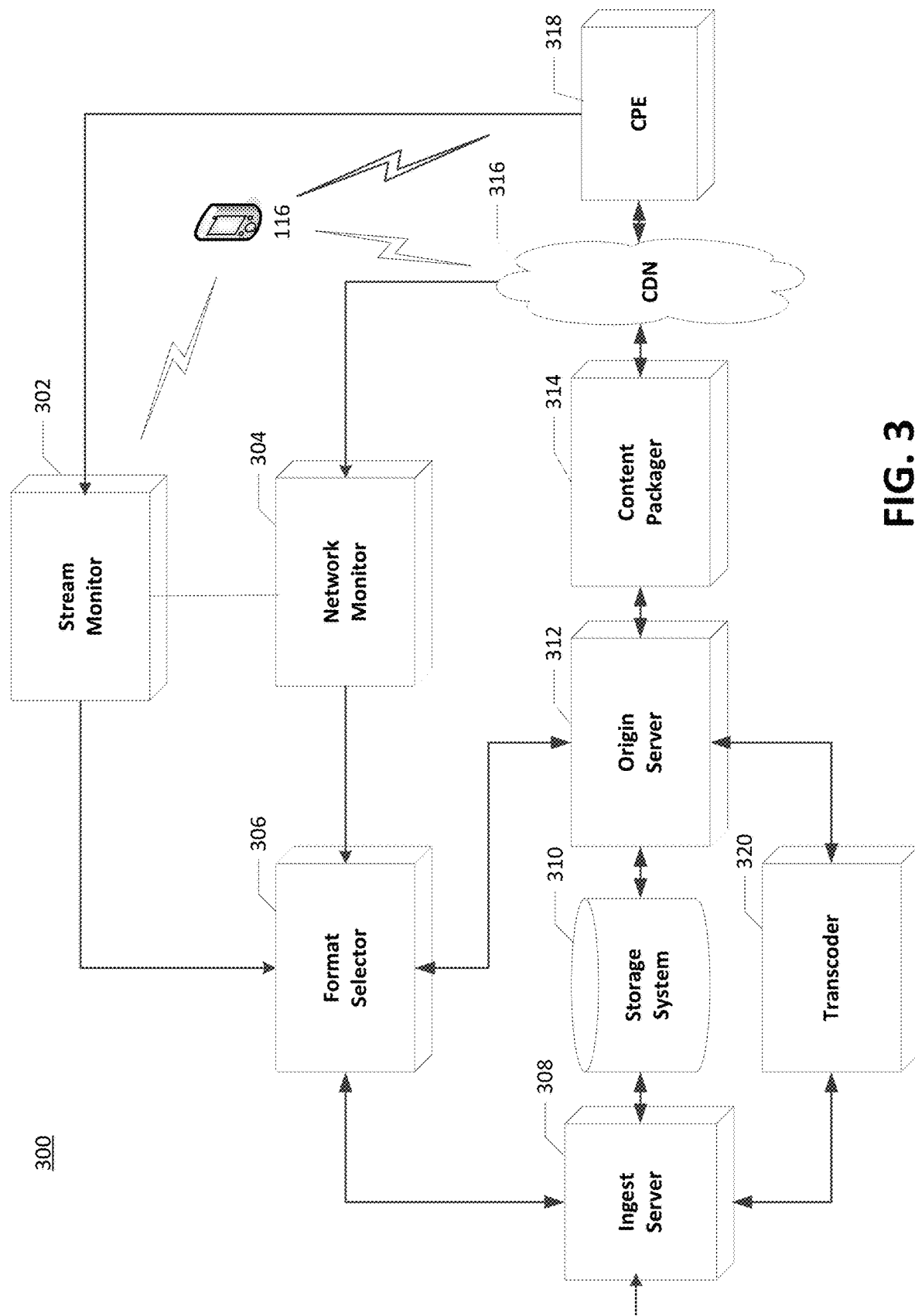
FIG. 3 illustrates an example network configuration in accordance with one or more aspects as described herein.

FIG. 3 illustrates an example network configuration 300 in accordance with one or more aspects as described herein. The components illustrated may be implemented using the computing device 200, as illustrated in FIG. 2, or any other suitable computing devices. In some embodiments, content, such as video programming, may be received by the ingest server 308 for processing and storing in the storage system 310. For example, the ingest server 308 may communicate with and receive content from satellite receivers, antennas, cable or other communications pathways in order to receive content, such as movies and other video programming. Content may be received in a particular compression format and resolution profile, for example, 1920×1080, 30 frames per second, at 2 Mbps HEVC, etc. Received content may be stored in the storage system 310 so that it can be made available to the origin server 312 for providing to users. When content is first added to the storage system 310, it may be stored in the compression format and resolution as received, for example, MPEG-2 TS format. In some embodiments, the content may be stored as a master copy from which other versions may be created by use of the transcoder 320. The master copy may be referred to as a mezzanine copy or a distribution copy. In some embodiments, the ingest server 308 may cause the content to be transcoded from one format to another format by the transcoder 320, before storing the content in the storage system 310. For example, the content may be transcoded from a first compression format and resolution profile to a second compression format and resolution profile. The ingest server 308 may also segment or otherwise package content according to one or more streaming protocols before storing the content in the storage system 310.

In some embodiments, the transcoder 320 may transcode the content into one or more encoded streams of digital data according to the MPEG-4 standard. In some embodiments, the transcoder may provide multiple encoded streams for a particular content item. For example, the transcoder 320 may output three streams of data for a particular movie, where each stream may be encoded to different a compression format having a different bitrate encoding. Continuing the example, the transcoder may output encoded streams having bitrates of 6250 kbps, 3480 kbps and 1663 kbps, for example. Those skilled in the art will realize that any number of streams may be output by the transcoder for a particular content item, and the streams may have any desired bitrate encoding. In various embodiments, the transcoding of a content item may be performed by the transcoder 320 upon request by the ingest server 308 or upon request by the origin server 312. The transcoded content may be provided to the requesting server (ingest server or origin server), which may then store portions or all of the transcoded content in the storage system 310, in various embodiments.

In some embodiments, the bitrate selected for encoding may depend on the type of content or a quality of the content. In other examples, the bitrate may be selected based on the intended use of the resulting encoded content. For example, various bitrate encodings may be used to create streams of content appropriate for presentation on a range of devices, including the wireless devices 116 and 117 and televisions 112 of FIG. 1. Audio and video content associated with a particular content item may be encoded at the same bitrate or they may be encoded at different bitrates.

In some embodiments, the bitrate selected for encoding may depend on an expected or determined demand for the content by users. For example, if it is expected that a particular encoding will be popular among users, then the transcoder 320 may be used to produce that encoding for storage and future delivery to users.

Origin server 312 may provide one or more of the encoded streams output by the transcoder 320 to the packager 314. In some embodiments, the packager 314 may package one or more encodings of a transcoded content item according to various adaptive streaming standards, such as the Dynamic Adaptive Streaming over HTTP (MPEG-DASH) standard. In some embodiments, the packager 314 may divide an encoded stream into segments of equal play time, for example, 2 second segments or 4 second segments. The number of bits in any segment may depend on the bitrate encoding used by the transcoder in creating the stream. For any content item, segments may be created of each encoded stream. In some embodiments, the packager 314 may convert content packaged for one adaptive streaming technology to content packaged for another adaptive streaming technology.

The packager 314 may also create a manifest file, which may be referred to as a media presentation description (MPD) file, which may provide one or more URLs that indicate access locations for the segments, including segments from each encoded stream. In some embodiments, the manifest file and/or segments may be located in the storage system 310. In some other embodiments, the manifest file and/or the segments may be located elsewhere in the network 300, for example, in cache storage provided by the content delivery network (CDN) 316.

In some embodiments, content may be requested by the customer premises equipment (CPE) 318 or by a mobile user device, such as wireless device 116. For example, a user may navigate various menus available via a gateway interface device, such as the gateway interface device 111 of FIG. 1, to request to view a movie. One or more of the components depicted in the network configuration 300 may receive requests for content from any number of CPEs and/or mobile user devices. In some embodiments, the requests may be received by the origin server 312.

A client device, for example, a DASH client in the CPE, may obtain access information for the segments from the manifest file. In some embodiments, a client device may select among the various bitrate encoded segments for any particular time period. It should be understood by those skilled in the art that the segments may be stored or cached at various places in the network (for example, at an edge cache, network or local storage, or at a content router) in order to provide various benefits, such as to increase the efficiency in use of the network.

In some embodiments, the processes of encoding and packaging may occur without request from the CPE 318. For example, these processes may occur prior to a request, for example, as discussed above, the encoding and packaging may take place upon arrival of the content at the ingest server 308. In some embodiments, the transcoding and/or packaging of the content item may be done in a "just in time" manner, for example, it may be done upon receiving a request for content item from a CPE 318. For example, the content may be stored in one format and transcoded to a second format for serving to the CPE 318, upon request for the content by the CPE 318.

In various embodiments, the CPE 318 (or other device, such as the mobile user device 116) may send a request for a content item to the origin server 312. The stream monitor 302 may collect content usage information related to content requests from one or more CPEs 318. In some embodiments, the stream monitor 302 may communicate with the CPE 318, and other CPEs and user devices, to obtain usage information. In other embodiments, the stream monitor 302 may receive usage information via another device in the network. The stream monitor may receive usage information from any device that may monitor requests or responses related to user consumption of content. In other embodiments, the stream monitor 302 may monitor a communications path in order to determine usage information. For example, the stream monitor 302 may monitor a network distribution path which may be transporting content, such as a distribution path of the CDN 316, and determine the usage information from monitoring the network distribution path.

In some embodiments, the stream monitor 302 may track and/or store data related to the popularity of a particular content item, such as a video or movie. In some embodiments, the stream monitor 302 may keep a count of the number of requests received for a particular content item having a particular compression format and a particular resolution. For example, the stream monitor 302 may count the number of requests received for a content item with content ID 1067 in HEVC format with a resolution of 720p60. Examples of compression formats include MPEG-2, MPEG-4 Part 10 Advanced Video Coding (MPEG-4 AVC), and High Efficiency Video Coding (HEVC), among others. Commonly used video signal formats (referred to herein as resolutions or resolution profiles) may include 1280×720p60 (720p60), 1280×720p30 (720p30), 768×432, 640×360, 512×288, 488×336, 1080i, and 480i.

In some embodiments, it may be determined that certain content may be requested more often in a particular compression format and resolution profile while other content may be requested more often in another compression format and resolution. For example, users with smaller displays may less often request certain movies that may be best viewed on a large screen. In some embodiments, it may be determined that certain types of content may be more often consumed by mobile users, via their mobile phones or tablets. In addition, in some embodiments the stream monitor 302 may determine that certain portions of a content item are requested more than other portions of the content item. In some embodiments, this content (or portions) may be transcoded and stored in those compression formats and resolutions. In some embodiments, data or statistics collected by the stream monitor 302 may be provided to a format selector 306.

The format selector 306 may determine which formats and/or portions of content should be kept in storage and which formats/portions of a previously stored content item should be removed from storage. In some embodiments, the format selector 306 may implement a policy, for example a policy specified by a network operator, for use in managing the storage of content items.

In some embodiments, a network monitor 304 may collect information related to network bandwidth usage and cache usage associated with content items delivered by the CDN 316. For example, for each content item (or portion of a content item) delivered by the CDN 316, a cache hit ratio may be determined. A cache hit may correspond to a request for a content item, or portion of a content item, that is available to be retrieved from the cache. The cache hit ratio may be defined as the number of cache hits divided by the number of requests, for a particular content item, or a particular portion of the content item. As an example of the network bandwidth usage collected, the network monitor 304 may collect data related to the bitrate requested for a particular content item. In some embodiments, data or statistics collected by the network monitor 304 may be provided to the format selector 306.

As discussed above, the format selector 306 may receive data and statistics from the network monitor 304 and from the stream monitor 302. The network monitor 304 may provide, for each content item provided via the CDN 316, a content identifier (content ID), the cache efficiency value, for example, in the form of a cache hit ratio, and the bitrate, among others. In some embodiments, the network monitor 304 may provide the cache efficiency value and the bitrate associated with portions of content items, such as the segments of the content items as may be used with various adaptive streaming technologies. The data provided by the network monitor 304 may be referred to as efficiency information. In some embodiments, the network monitor 304 may evaluate the efficiency information for a particular content item, or portion thereof, and provide an efficiency score. For example, the cache efficiency value may be combined with (e.g. multiplied by) the bitrate and provided as the efficiency score for a content item.

The stream monitor 302 may provide, for each content item requested by a CPE 318, or portion thereof, the content ID, the compression format and the resolution profile of the content, among others. The data provided by the stream monitor 302 may be referred to as usage information. In some embodiments, the stream monitor 302 may determine a usage score for a particular content item, or portion thereof, and provide the usage score to the format selector 306. For example, the number of requests for a particular content item having a particular compression format and resolution profile may be added up over a period of time and provided as the usage score for the content item. In other embodiments, the usage score may be provided as a percentage of the total requests for content, or portions thereof. Both the efficiency scores and usage scores may be normalized to a reference range, such as a range from 0 to 100.

In some embodiments, the format selector 306 may determine a ranking of the content items, or portions of the content items, having a particular compression format and resolution profile, according to a policy or formula. In an exemplary embodiment, the policy may be based on a weighted combination of the efficiency score and the usage score for the content items (or portions of the content items). In other words, an overall score for a particular content item may be calculated based on a formula, such as A*usage score+B*efficiency score, where A and B may be parameters selected according to operator preference.

In some embodiments, the weighting of the variables in the formula may be adjusted by a network operator, depending on policy preferences. For example, if more focus is desired on the popularity of content, then parameter A may be set to a value larger than parameter B. In other embodiments, if more focus is desired on cost savings in network delivery costs, then B may be set to a value larger than A. In various embodiments, the values for A and B may be adjusted manually or automatically, according to various schemes, such as time of day, day of week, or the anticipated release of popular programming, such as a recording of a popular show or sporting event.

In some embodiments, a visual user interface, such as a graphical user interface, may be provided to allow a network operator to adjust the policy using graphical methods. For example, an operator may be provided with a user interface element, e.g. a sliding bar, which may be moved between two stop positions to adjust values for the A and B multipliers in the above formula. Taking a horizontal slider as an example, a left most position may assign a relatively larger value to the A multiplier and a relatively smaller value to the B multiplier. A midpoint between the left and right most positions, may represent A=B, while a rightmost position may represent a value of B much larger than the value for A. Although two multipliers A and B are discussed above, it should be understood by those skilled in the art that one or both of A and B may be omitted in some embodiments.

The table below illustrates an example ranking by the format selector 306, with data provided by the stream monitor 302 and network monitor 304. In various embodiments, the stream monitor 302 and the network monitor 304 may be implemented in a single device or as separate devices. As shown in the table, various content items, each having a content ID, compression format, resolution profile, usage score and efficiency score are gathered for analysis according to the policy.

For example, the top row of data depicts a content item having a content ID 1067 and a compression format of HEVC and a resolution of 720p60. The usage score is 95 and the efficiency score is 73, as provided by the stream monitor 302 and the network monitor 304 respectively. In the example below, the formula used is as follows: Weighted Score=3*Usage Score+2*Efficiency Score. In some embodiments, the content ID may represent an entirety of a content item, e.g. a movie. In other embodiments, the content ID may represent a portion of a content item, e.g. a segment of a movie. In still other embodiments, each content ID may represent either an entirety of a content item or a portion of a content item. In other words, both may be represented in the ranking, in some embodiments.

| Rank | Content ID | Compression Format | Resolution Profile | Usage Score | Efficiency Score | Weighted Score |
|---|---|---|---|---|---|---|
| 1 | 1067 | HEVC | 720p60 | 95 | 73 | 431 |
| 2 | 3884 | HEVC | 720p30 | 73 | 92 | 403 |
| 3 | 1004 | MPEG-4 AVC | 480p30 | 44 | 63 | 258 |
| 4 | 6983 | MPEG-4 AVC | 2160p60 | 60 | 27 | 234 |
| 5 | 5897 | HEVC | 480p30 | 26 | 54 | 186 |

After the format selector 306 completes the processing, e.g. according to a policy, a weighted score may be assigned to each content item, or portion thereof. The format selector 306 may rank the content items (or portions) according to each content item's weighted score, as shown in the table above.

It should be noted that, in various embodiments, the usage score and the efficiency score may also be calculated by the format selector 306, using data provided by the stream monitor 302 and the network monitor 304, or the scores may be calculated by the stream monitor 302 and network monitor 304 and provided to the format selector 306. Also, ranking and scores can be determined, and corresponding policies implemented, for different versions of the same content item (e.g., different compression formats or resolution profiles) as well as for different content items.

In various embodiments, any number of beneficial methods may be performed, based on the information in the ranking. In an exemplary embodiment, based on the ranking, it may be determined by the format selector 306, or associated computing device, that a number of the top ranking content items should be stored in storage system 310. The number of content items may be determined according to the policy and/or may be determined at least in part based on the amount of storage space available for storing the content items. For example, it may be determined to store the top four content items in storage system 310. As a result of storing these content items, requests for these content items may be serviced without need for real time or on-demand transcoding. As an illustration, content ID 1067 in the table above is the top ranked content item according to the example, which may be based on a business policy or a dynamic network management algorithm implemented over a particular time period (e.g., a weekday evening). Content ID 1067 has a high usage score and a high efficiency score, giving it a high weighted score according to the formula above. It may be likely that this content item, in the compression format and resolution listed, will be requested again by CPEs 318 or other user devices. Therefore, by storing the content item in the storage system 310, it can be provided to the CPE quicker and in a more efficient manner, without additional transcoding. In various embodiments, the ingest server 308 and/or the origin server 312 may cause the content item to be transcoded by the transcoder 320 (if needed) and stored in the storage system 310. In some embodiments, it may be determined to store a portion of the content item, rather than storing the entire content item.

In another exemplary embodiment, the format selector 306 may communicate information related to the ranking to the ingest server 308 and/or to the origin server 312. The ingest server 308 and/or the origin server 312 may search the storage system 310, or otherwise communicate with the storage system 310, to locate content items, or portions of content items, that are not in the ranking (such as the table above). Previously stored content items that are not listed in the ranking may be removed from the storage system 310, for example, to reclaim storage space for use in storing other content items, such as those listed in the ranking. Depending on the policy in use, the items selected for removal may be those items which are rarely requested by CPEs 318 and it may not be efficient to keep copies of those items in storage. As noted above, a master copy of any content item may be stored in the storage system 310 and the transcoder 320 may be used to create, when needed, content items in various compression formats and resolution profiles, from the master copy. The master or mezzanine copy may be retained in storage and may not be subject to removal, in some embodiments.

In some embodiments, the format selector 306 may communicate with the ingest server 308 to select compression formats and resolutions of content items to be ingested, e.g., by requesting such compression formats and resolutions from a content source or content creator. In some embodiments, the ingest server 308 and/or the origin server 312 may cause removal of content items from the storage system 310, based on the ranking. The deleted content items may be later generated, as needed, by transcoding from another compression format/resolution at time of request.

In various embodiments, once the ranking is generated, content items ranked above a determined threshold may be selected for storing. Previously stored content items not ranking above the threshold may be deleted from storage. In some embodiments, the threshold may correspond to a number N of items ranking highest in the ranking, e.g., the top N items. In some embodiments, if any of the top N items are not currently stored in storage system 310, transcoder 320 may be used to generate the selected content items from a master copy or from another representation of the content items (different compression format and/or resolution), if available. In some embodiments, the ranking may be generated periodically, so that the ranking remains fresh, e.g., based on recent network activity.

In other embodiments, portions of a previously stored content item may be deleted or otherwise removed from storage while other portions may be retained. For example, one or more portions may be determined to be often requested (e.g., having usage above a threshold) while other portions may not be often requested. Continuing the example, it may be determined that a large number of users request an initial portion (e.g. the first 15 minutes) of a movie in a particular format while a much smaller number of users request the remaining portion of the movie. As a result of this determination, the initial portion may be stored while the remaining portion may not be stored. Instead, the remaining portion may be transcoded to the format from another copy (e.g. from a master copy) upon reception of a request for the remaining portion. In some other embodiments, the amount of a content item to store may be determined based on the usage information and may cause storage of portions other than an initial portion (e.g. middle portions and/or ending portions). The amount to store may correspond to a determined number of bits or a determined playback time or various other representations of a portion size. In some embodiments, a larger portion may be stored for a content item ranked higher in the ranking.

In some embodiments, the format selector 306 may communicate information about the ranking to the ingest server 308 and the ingest server may manage transcoding, storing and removal of content items from the storage system 310. In some embodiments, the ingest server 308 may select a compression format and resolution of content to be ingested, according to information from the ranking. In various embodiments, the ingest server 308 may determine a compression format and resolution profile for use in ingesting a content item, based on the content item having a similarity to a content item in the ranking. For example, a movie of the same genre as a movie in the ranking may be ingested having the same compression format and resolution profile as the movie in the ranking.

As discussed above, at the time of playback, the CPE may select and/or request the compression format and resolution profile to play a content item, e.g., on a fragment by fragment basis. If a fragment having the selected compression format and resolution is stored at either the CDN 316 or the storage system 310, the fragment may be delivered to the CPE directly. If a fragment having the selected compression format and resolution is not stored at either the CDN 316 or the storage system 310, then the fragment may be created, e.g., in real time, by transcoding the content item from another available compression format and resolution. The transcoded fragment may be provided to the origin server 312 for sending to the CPE 318. The transcoded fragment may be cached at the CDN 316 for a period of time following delivery of the fragment, for example, in order to make it available in case it is requested by another CPE 318. In some embodiments, a transcoder may be located close to the CPE 318 for transcoding the fragments which are not already available in a selected compression format and resolution, as discussed above, in order to more efficiently use network bandwidth.

It should be understood that the methods as taught herein apply as well as to portions of content. In some embodiments, various fragments, segments or portions of a content item may be transcoded and stored while other portions may be transcoded when the content item is requested by the CPE 318. For example, an initial portion of a content item may be pre-transcoded, and a remaining portion of the content item may be transcoded on demand, e.g., just-in-time transcoded, when delivered in response to a request from a CPE 318. In addition, as discussed above, segments of content may be assigned an ID and have a compression format and resolution profile and may be ranked according to network efficiency and usage, as disclosed above.

Figure 4:
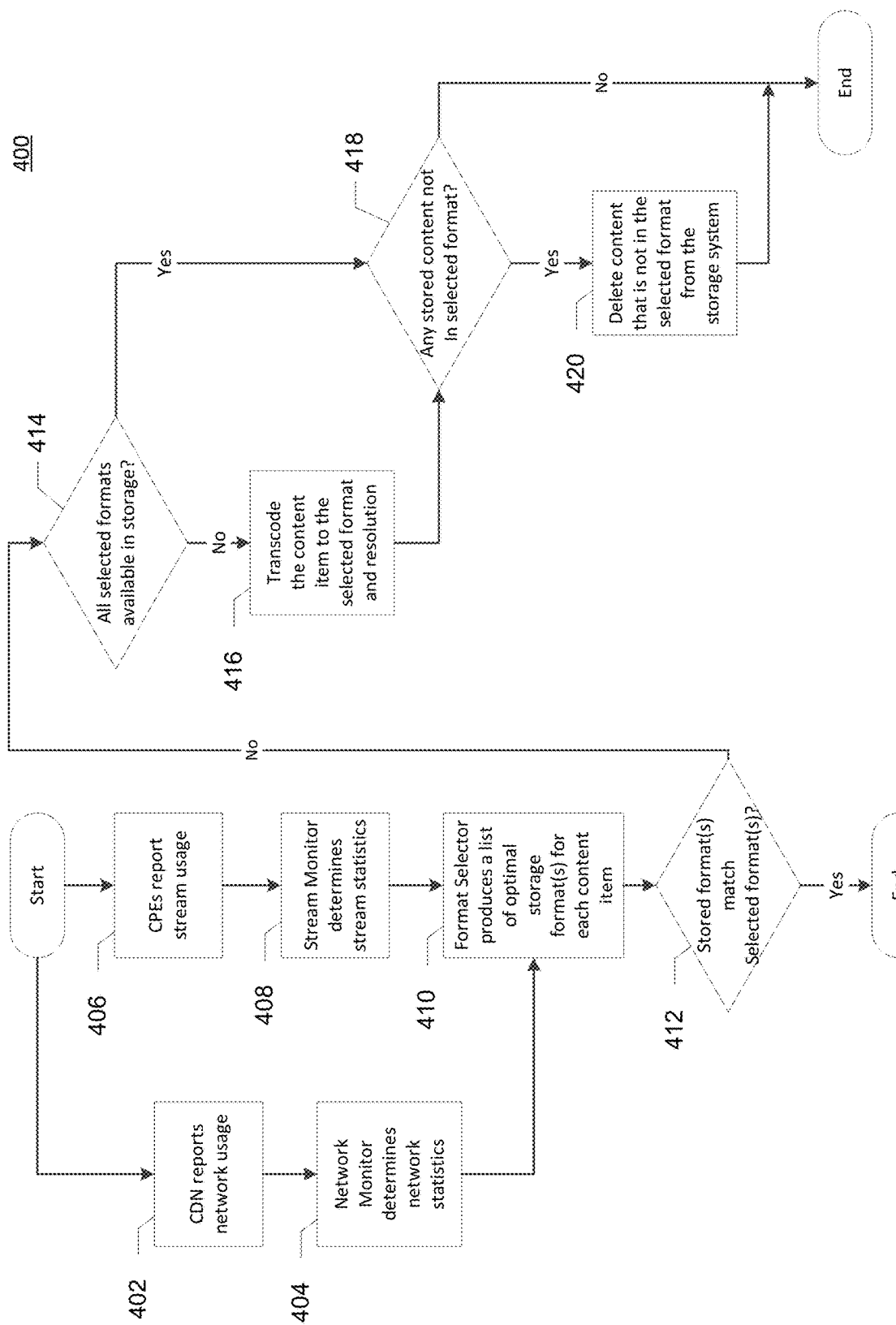
FIGS. 4-6 are example flow charts illustrating methods performed in accordance with one or more aspects as described herein.

FIG. 4 is an exemplary flow diagram illustrating an example method 400 in accordance with one or more disclosed features described herein. In one or more embodiments, the method illustrated in FIG. 4 and/or one or more steps thereof may be performed by one or more computing devices (e.g., format selector 306, stream monitor 302, set-top box 113, and the like). In other embodiments, the method illustrated in FIG. 4 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 402, network components involved in content delivery, e.g., the CDN 316, may report or provide access to network usage information. For example, the CDN may report network efficiency information, for example, cache efficiency statistical data, to the network monitor 304 corresponding to various content items (or portions of content items). At step 404, a computing device, such as the network monitor 304, may calculate various network statistics and provide the statistics to another computing device, such as the format selector 306. The network statistics may include an efficiency score, calculated for each content item delivered or being delivered. In some embodiments, the efficiency score may represent the cache efficiency for the content item combined with (e.g., multiplied by) the bitrate of the content item.

At step 406, which may be performed at the same or different time as step 402 and/or step 404, a user device, such as CPE 318, may report transmission usage, such as stream usage, to the stream monitor 302. In some embodiments, the stream usage may correspond to the content items requested by the CPE 318. For example, when a user requests a particular movie, the CPE 318 may send or provide access to the request (or related information) to the stream monitor 302. At step 408, the stream monitor 302 may determine stream statistics and report the statistics to the format selector 306. For example, the stream monitor may add up the number of requests for a particular content item having a particular compression format and resolution profile and may report the total count as a usage score for that content item.

At step 410, a computing device, such as the format selector 306, may receive inputs from steps 404 and 408 and produce a list of optimal storage compression format(s) and resolution(s) for each content item. The format selector 306 may combine the information provided by the stream monitor 302 and the network monitor 304 to generate a weighted score for each content item according to a policy (or formula), as discussed above in relation to FIG. 3. The format selector 306 may generate a ranking of the content items.

At step 412, it may be determined, for example by the ingest server 308 or by the origin server 312, whether the content items stored in a storage system, which may comprise one or more storage devices such as storage system 310, match or correspond to the content items determined or ranked, e.g., by the format selector 306 in step 410. If the sets match, the method may end. If the content item sets do not match, the method may continue to step 414, where it may be determined whether all of the content items determined or ranked in step 410 are currently available in storage. If any of the content items are not currently stored, the method may continue at step 416 where any missing compression formats and resolution profiles may be generated by transcoding a master copy (or other copy) of a particular content item.

At step 418, it may be determined whether any of the stored content is in a compression format or resolution that is not one of the determined or ranked compression formats/resolutions, e.g., in step 410. If any content is not in a determined compression format and resolution, the method may continue to step 420 where those content items may be removed from the storage system 310.

Figure 5:
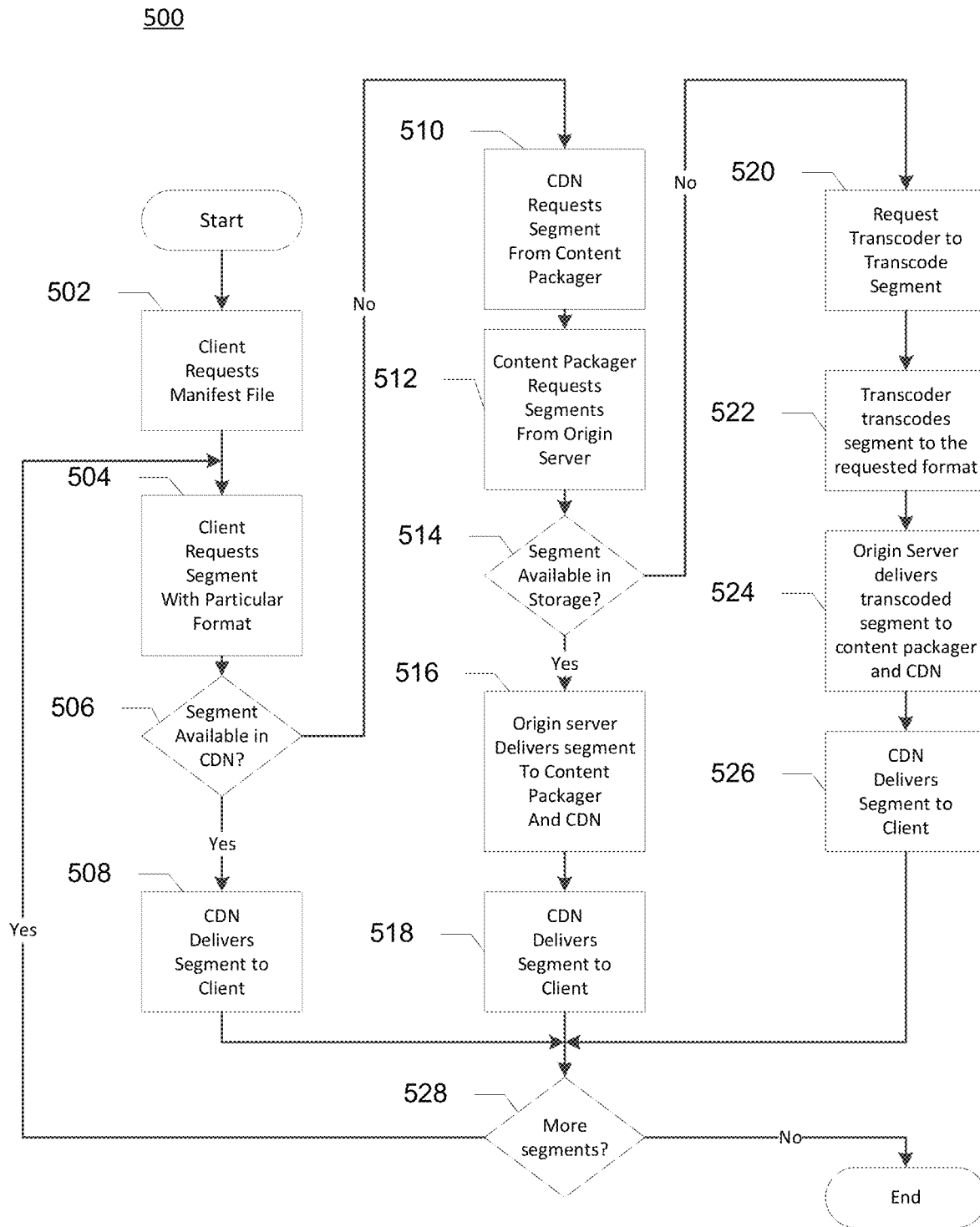

FIG. 5 is an exemplary flow diagram illustrating an example method 500 in accordance with one or more disclosed features described herein. In one or more embodiments, the method illustrated in FIG. 5 and/or one or more steps thereof may be performed by one or more computing devices (e.g., format selector 306, stream monitor 302, set-top box 113, and the like). In other embodiments, the method illustrated in FIG. 5 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 502, a device, such as the CPE 318, may request a manifest file, for example, from the origin server 312. In some embodiments, the manifest file may be associated with a content item, such as content offered to users via live or video-on-demand transmissions.

After retrieving the manifest file, the CPE 318 may begin requesting segments of content in step 504. For example, the CPE may inspect the contents of the manifest file and select segments appropriate for retrieval and presentation to a user. Alternatively, the CPE 318 or any other user device may request content segments without first requesting a manifest file per step 502.

At step 506, it may be determined whether the segment requested can be retrieved from storage in the network (e.g., a cache hit), for example from the CDN 316. If so, then the segment may be delivered from the storage to the device at step 508 and the method may continue at step 528. If not, the method may continue at step 510 where the segment may be requested from elsewhere in the network, such as from the content packager 314. At step 512, the content packager 314 may request the segment from the origin server 312. At step 514, it may be determined whether the segment requested is available in storage system 310. If the segment is available, it may be delivered to the CDN 316 at step 516 and to the CPE 318 in step 518.

If, at step 514, it is determined that the segment is not available in the storage system 310, a computing device such as the origin server 312 may request at step 520 that the transcoder 320, or another transcoder in the network, generate the segment by transcoding the content requested from another format to create the segment in the requested compression format and resolution profile.

At step 522, the transcoder 320 may transcode content to create the segment in the requested format. At step 524, the origin server 312 may deliver the transcoded segment to the content packager 314, which may pass the content to the CDN 316. At step 526, the segment may be delivered to the CPE.

At step 528, it may be determined whether or not additional segments have been requested. If additional segments were requested, the method may continue at step 504.

The method above describes the delivery of a segment but any number of segments may be requested and delivered according to the methods as described herein.

Figure 6:
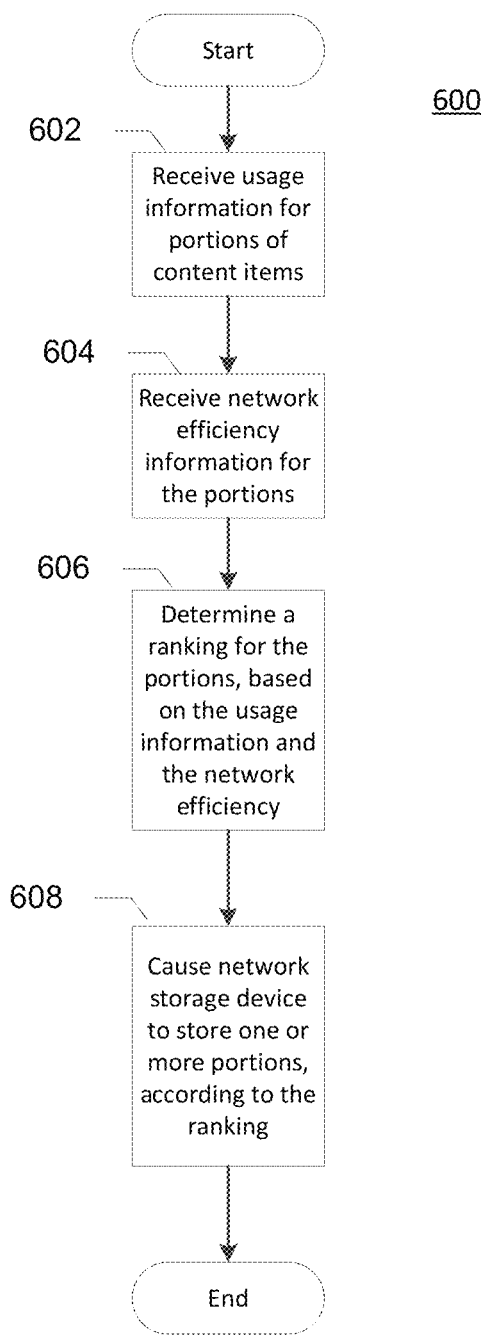

FIG. 6 is an exemplary flow diagram illustrating an example method 600 in accordance with one or more disclosed features described herein. In one or more embodiments, the method illustrated in FIG. 6 and/or one or more steps thereof may be performed by one or more computing devices (e.g., format selector 306, stream monitor 302, set-top box 113, and the like). In other embodiments, the method illustrated in FIG. 6 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

At step 602 a plurality of user devices, such as CPE 318, may report transmission usage, such as stream usage, to the stream monitor 302. In some embodiments, the stream usage may identify portions of one or more content items requested by the user devices. For example, when a user requests a portion of a particular movie, the CPE 318 may send or provide access to the request or related information to the stream monitor 302. This information may be used to determine the popularity of one or more portions of a content item. For example, the stream monitor may add up the number of requests for a particular portion of a content item having a particular compression format and resolution and may report the total count as a usage score for that portion of the content item.

At step 604, which can be performed at the same or different time as step 602, network components involved in content delivery, e.g. the CDN 316, may report or provide access to network usage information. For example, the CDN 316 may report cache efficiency statistical data to the network monitor 304 corresponding to portions of various content items. Various network statistics may be computed and provided to a computing device, such as the format selector 306. The network statistics may include an efficiency score, calculated for each portion of the content item delivered or being delivered. In some embodiments, the efficiency score may represent the cache efficiency for the portion of the content item combined with (e.g., multiplied by) the bitrate of the content item.

At step 606, a computing device, such as the format selector 306, may determine a ranking for portions of each content item, based on the usage information and the network efficiency. The format selector 306 may combine the information provided by the stream monitor 302 and the network monitor 304 to generate a weighted score for each portion of the content item according to a policy or formula, as discussed above in relation to FIG. 3. The format selector 306 may rank portions of the content items in a list.

At step 608, a network storage device, such as the storage system 310 of FIG. 3, may be caused to store one or more portions of the content item, according to the ranking. For example, portions having a ranking above a predetermined threshold may be stored. Portions having a ranking below the predetermined threshold may not be stored and these portions may be generated upon request by transcoding a portion from another version of the content item.

The descriptions above are merely example embodiments of various concepts. They may be rearranged/divided/combined as desired, and one or more components or steps may be added or removed without departing from the spirit of the present disclosure. The scope of this patent should only be determined by the claims that follow.

The invention claimed is:

1. A method comprising:
receiving, by a computing device, usage information associated with a first portion of a content item;
transcoding, based on the usage information and before receiving a request for the content item in a first format, the first portion from a second format to the first format;
receiving, from a requesting device after transcoding the first portion, the request for the content item in the first format; and
after receiving the request:
sending, to the requesting device, the transcoded first portion; and
transcoding a second portion of the content item from the second format to the first format.

2. The method of claim 1, further comprising:
determining that second usage information associated with the second portion satisfies a threshold; and
designating, based on the second usage information satisfying the threshold, the second portion for an on-demand transcoding.

3. The method of claim 1, further comprising:
generating, based on a determined size of the first portion, first manifest data indicating access locations for a first plurality of segments of the transcoded first portion, wherein the first manifest data omits information of the second portion in the first format; and storing, before receiving the request, the first manifest data and the first plurality of segments.

4. The method of claim 1, further comprising:
determining different popularities of different portions of the content item;
determining the first portion based on a first popularity of the first portion; and
determining the second portion based on a second popularity of the second portion.

5. The method of claim 1, wherein transcoding the first portion is further based on network efficiency information that is based on one or more of:
a bitrate corresponding to the first portion; or
a cache efficiency corresponding to the first portion.

6. The method of claim 1, further comprising determining a size of the first portion based on:
a weighted combination of the usage information; and
network efficiency information.

7. The method of claim 1, further comprising determining, based on the usage information:
an amount of the content item to be transcoded to the first format prior to receiving the request for the content item in the first format; and
an amount of the content item that will be transcoded to the first format after receiving the request for the content item in the first format.

8. The method of claim 7, wherein said usage information is based on a quantity of requests for the first portion of the content item in the first format.

9. The method of claim 1, further comprising:
storing the transcoded first portion;
sending, to the requesting device, the transcoded second portion; and
discarding, after sending the transcoded second portion, the transcoded second portion.

10. The method of claim 1, wherein said usage information is based on a quantity of requests for the first portion of the content item.

11. The method of claim 1, wherein said usage information is based on a quantity of requests for the first portion of the content item in the first format.

12. The method of claim 1, further comprising:
transcoding further portions, other than the first portion and the second portion, of the content item at different times, based on a popularity of each of the further portions.

13. A method comprising:
determining, based on historical usage of a content item:
a first portion, of the content item, for transcoding prior to receiving a request for the content item; and
a second portion, of the content item, for transcoding after receiving the request for the content item;
transcoding the first portion prior to receiving the request for the content item;
receiving, from a requesting device and after transcoding the first portion, the request for the content item; and
after receiving the request for the content item:
sending, to the requesting device, the transcoded first portion; and
transcoding the second portion of the content item.

14. The method of claim 13, further comprising:
determining that usage information associated with the second portion satisfies a threshold; and designating, based on the usage information satisfying the threshold, the second portion for an on-demand transcoding.

15. The method of claim 13, further comprising:
determining different popularities of different portions of the content item; and
wherein determining the first portion is further based on a first popularity of the first portion; and
wherein determining the second portion is further based on a second popularity of the second portion.

16. The method of claim 13, wherein determining the first portion is further based on network efficiency information that is based on one or more of:
a bitrate corresponding to the first portion; or
a cache efficiency corresponding to the first portion.

17. The method of claim 13, further comprising determining, based on the historical usage of the content item, an amount of the content item to be transcoded prior to receiving the request for the content item.

18. The method of claim 13, further comprising:
storing, after determining that the historical usage of the content item satisfies a threshold, the transcoded first portion;
sending, to the requesting device, the transcoded second portion; and
discarding, after sending the transcoded second portion, the transcoded second portion.

19. The method of claim 13, further comprising:
transcoding further portions, other than the first portion and the second portion, of the content item at different times, based on a popularity of each of the further portions.

20. A method comprising:
receiving, by a computing device, usage information associated with a content item;
determining, based on the usage information:
a first portion, of the content item, to be transcoded prior to receiving a request for a first version of the content item; and
a second portion, of the content item, to be transcoded after receiving the request for the first version of the content item;
transcoding the first portion to the first version;
storing the transcoded first portion; and
designating the second portion for an on-demand transcoding.

21. The method of claim 20, further comprising:
receiving, from a requesting device, the request for the first version of the content item; and
based on receiving the request:
sending, to the requesting device, the transcoded first portion; and
transcoding the second portion.

22. The method of claim 21, further comprising:
sending, to the requesting device, the transcoded second portion; and
discarding, after sending the transcoded second portion, the transcoded second portion.

23. The method of claim 20, wherein determining the first portion comprises determining, based on the usage information, an amount of the content item to be transcoded prior to receiving the request for the first version of the content item.

24. The method of claim 20, further comprising:
generating, based on a determined size of the first portion, manifest data indicating access locations for a first plurality of segments of the transcoded first portion; and
storing, before receiving the request for the first version of the content item, the manifest data, wherein the manifest data omits information of the second portion.

25. The method of claim 20, wherein transcoding the first portion is based on network efficiency information that is based on one or more of:
a bitrate corresponding to the first portion; or
a cache efficiency corresponding to the first portion.

26. The method of claim 20, further comprising:
transcoding further portions, other than the first portion and the second portion, of the content item at different times, based on a popularity of each of the further portions.

* * * * *